US012699925B2

(12) United States Patent
Lee et al.

(10) Patent No.: US 12,699,925 B2
(45) Date of Patent: Aug. 4, 2026

(54) DISTRIBUTED ARTIFICIAL INTELLIGENCE SYSTEM USING TRANSMISSION OF COMPRESSED GRADIENTS AND MODEL PARAMETER, AND LEARNING APPARATUS AND METHOD THEREFOR

(71) Applicant: Electronics and Telecommunications Research Institute, Daejeon (KR)

(72) Inventors: An Seok Lee, Daejeon (KR); Yong Jin Kwon, Daejeon (KR); Heesoo Lee, Daejeon (KR); Yo Seb Jeon, Pohang-si (KR); Jae Won Yun, Pohang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 741 days.

(21) Appl. No.: 18/085,140

(22) Filed: Dec. 20, 2022

(65) Prior Publication Data

US 2023/0196205 A1     Jun. 22, 2023

(30) Foreign Application Priority Data

| Dec. 20, 2021 | (KR) | ........................ 10-2021-0183176 |
| Dec. 19, 2022 | (KR) | ........................ 10-2022-0178470 |

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
CPC ................................ G06N 20/00; G06F 17/18
See application file for complete search history.

(56) References Cited

U.S. PATENT DOCUMENTS

| 2020/0394514 A1 | 12/2020 | Cho et al. |
| 2021/0158216 A1* | 5/2021 | Du ......................... G06N 20/00 |
| 2024/0195434 A1* | 6/2024 | Reisser .................... G06N 7/01 |

OTHER PUBLICATIONS

Oh, Yongjeong, Namyoon Lee, and Yo-Seb Jeon. "Quantized compressed sensing for communication-efficient federated learning." In 2021 IEEE Globecom Workshops (GC Wkshps), pp. 1-6. IEEE, 2021. (Year: 2021).*

(Continued)

*Primary Examiner* — Casey R. Garner
(74) *Attorney, Agent, or Firm* — KILE PARK REED & HOUTTEMAN PLLC

(57) ABSTRACT

A learning method of distributed artificial intelligence is disclosed. The method is comprising: updating, by the local device, parameters of a corresponding local model by training the local model based on a corresponding local dataset; generating, by the local device, compressed gradient information by compressing gradients of the parameter of the local model; transmitting, by the local device, the compressed gradient information to a parameter server; reconstructing, by a parameter server, gradients of the parameters of the local model based on the compressed gradient information received from the local device; and updating, by the parameter server, parameters of a global model based on the reconstructed gradients of the parameters of the local model.

16 Claims, 8 Drawing Sheets

(56) References Cited

OTHER PUBLICATIONS

Siswanto, Arlene Elizabeth. "Block sparsity and weight initialization in neural network pruning." PhD diss., Massachusetts Institute of Technology, 2021. (Year: 2021).*

Bernstein et al., "SIGNSGD: Compressed Optimisation for Non-Convex Problems", arXiv:1802.04434v3, Aug. 7, 2018, 25 total pages.

Konecny et al., "Federated Learning: Strategies for Improving Communication Efficiency", arXiv:1610.05492v2, Oct. 30, 2017, pp. 1-10.

* cited by examiner

FIG. 2

Local model update based on local dataset —— S320

Local model parameter transmission to server —— S330

Global model update based on local model parameters —— S340

Global model parameter transmission to local device —— S350

FIG. 3

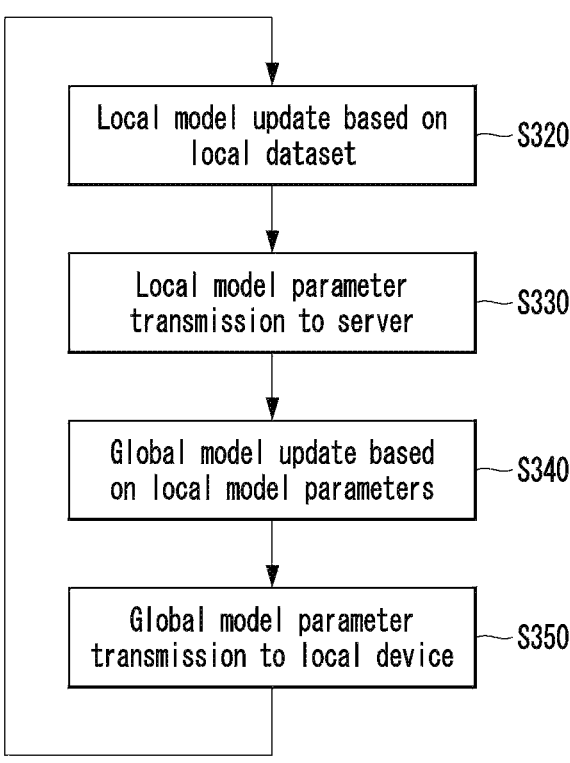

Input: learning rate $\delta$, current point $x_k$, # workers $M$ each with an independent gradient estimate $\tilde{g}_m(x_k)$ on server pull $\mathrm{sign}(\tilde{g}_m)$ from each worker push $\mathrm{sign}\left[\sum_{m=1}^{M} \mathrm{sign}(\tilde{g}_m)\right]$ to each worker on each worker $x_{k+1} \leftarrow x_k - \delta\, \mathrm{sign}\left[\sum_{m=1}^{M} \mathrm{sign}(\tilde{g}_m)\right]$

FIG. 4

```
function GradDrop(∇, B)
    ∇ + = residuals
    Select threshold: R% of |∇| is smaller
    dropped ← 0
    dropped[i] ← ∇[i]∀i : |∇[i]| > threshold
    residuals ← ∇ - dropped
    return sparse(dropped)
end function
```

FIG. 9

```
1  input: sparse tensor ΔW*, sparsity p
2  output: binary message msg
3  •  I ← ΔW*[·]≠0
4  •  b* ← 1 + ⌊log₂(log(←−1)/log(1−p))⌋
5  for i = 1,..,|I| do
6      •  d ← I_i − I_{i−1}
7      •  q ← (d − 1) div 2^{b*}
8      •  r ← (d − 1) mod 2^{b*}
9      •  msg.add(1,..,1, 0, binary_{b*}(r))
                └──┬──┘
                 q times
10 end
11 return msg
```

FIG. 10

```
HUFFMAN(C)
1   n = |C|
2   Q = C
3   for i = 1 to n − 1
4       allocate a new node z
5       z.left = x = EXTRACT-MIN(Q)
6       z.right = y = EXTRACT-MIN(Q)
7       z.freq = x.freq + y.freq
8       INSERT(Q, z)
9   return EXTRACT-MIN(Q)       // return the root of the tree
```

DISTRIBUTED ARTIFICIAL INTELLIGENCE SYSTEM USING TRANSMISSION OF COMPRESSED GRADIENTS AND MODEL PARAMETER, AND LEARNING APPARATUS AND METHOD THEREFOR

CROSS REFERENCE TO RELATED APPLICATION

The present application claims priority to Korean Patent Application No. 10-2021-0183176 filed on Dec. 20, 2021, and the Korean Patent Application No. 10-2022-0178470, filed Dec. 19, 2022, the entire contents of which is incorporated herein for all purposes by this reference.

TECHNICAL FIELD

The present disclosure relates to distributed artificial intelligence in which learning is performed in multiple distributed devices, and/or federated learning which is performed between multiple distributed devices.

RELATED ART

The statements in this section merely provide background information related to the following embodiments and may not constitute the prior art.

Various artificial intelligence technologies are applied to increase the transmission capacity and speed of communication. Distributed artificial intelligence technology is a key foundation technology that can be used when training for artificial intelligence models is performed based on collaboration with wireless devices. Especially, when local data containing privacy information of a wireless device is used, distributed artificial intelligence may be used to preserve the privacy of the device. Furthermore, when large amounts of local data that can be accessed only by wireless devices are used, distributed artificial intelligence may be used to avoid the overhead required for the transmission of local data. As described above, distributed artificial intelligence offers significant advantages in terms of device privacy and communication overhead in the learning (training) of artificial intelligence models.

As one of the distributed artificial intelligence technologies, federated learning is a decentralized approach that trains a machine learning model in a server by using distributed heterogeneous learning datasets, deployed in mobile devices, without sharing raw data with the server. Federated learning repeatedly performs distributed model learning through two tasks: model optimization and model aggregation, i.e., model averaging, using local datasets. For example, in every round, the server sends a global model to available mobile devices, and each of the mobile devices optimizes the global model with locally available data and then returns updated model parameters (or updated local gradients) to the server over a communication link. Accordingly, the server averages the local models or gradients received from the mobile devices, updates the global model, and repeatedly shares it.

As described above, optimizing a global model by using local datasets deployed in numerous mobile devices is a difficult task. The most significant problem is a high communication cost that is incurred when local computations are updated in the mobile devices and a server. The communication cost is proportional to the size of the parameters of the global model and the number of mobile devices connected to the server.

Therefore, there is a demand for technology for reducing the cost required to transmit and receive parameters in the process of training artificial intelligence distributed in a number of mobile devices.

SUMMARY

The present invention has been conceived to overcome the above-described problems, and an object of the present invention is to reduce a communication cost when transmitting information for the learning (training) of distributed artificial intelligence.

An object of the present invention is to propose a distributed artificial intelligence system that, in order to increase the efficiency and performance of the learning of distributed artificial intelligence and reduce the cost, compresses the gradient information of artificial intelligence models into a smaller amount of information and transmits the compressed gradient information so that the compressed gradient information can be reconstructed at low error level in a remote device, and also propose the remote device constituting a part of the system, a learning method, and a method for compressing and reconstructing gradient information.

According to an exemplary embodiment of the present disclosure, there is disclosed a method for learning of distributed artificial intelligence by a local device, the method comprising: updating, by the local device, parameters of a corresponding local model by training the local model based on a corresponding local dataset; generating, by the local device, compressed gradient information by compressing gradients of the parameter of the local model; transmitting, by the local device, the compressed gradient information to a parameter server, reconstructing, by a parameter server, gradients of the parameters of the local model based on the compressed gradient information received from the local device; and updating, by the parameter server, parameters of a global model based on the reconstructed gradients of the parameters of the local model.

The generating may comprise: a block sparsification step of transforming a high-dimensional local source vector which forms the gradients of the parameters of the local model, into a plurality of low-dimensional S-sparse sub-vectors; and a digital encoding step of transforming the plurality of low-dimensional S-sparse sub-vectors into a digital bit sequence form.

The block sparsification step may comprise: dividing the high-dimensional local source vector into L sub-vectors; and generating the low-dimensional S-sparse sub-vectors by selecting S largest elements from among the L sub-vectors and removing residual elements.

The block sparsification step may comprise: reconstructing compressed gradient information digitally encoded through the digital encoding step; storing the residual elements excluding the reconstructed gradient information from the high dimensional local source vectors; and adding the stored residual elements to a high-dimensional source gradient vector of a next order.

The generating the low-dimensional S-sparse sub-vectors may be performed in parallel for the L sub-vectors.

The generating the low-dimensional S-sparse sub-vectors may be performed based on an optimal sparsity level S associated with a quantization level Q that maximizes an optimization objective function in which local vector reconstruction performance is taken into consideration.

The digital encoding step may comprise: a step of transforming the plurality of low-dimensional S-sparse sub-vectors into a plurality of S-dimensional linear transformed vectors; and a scalar quantization step of transforming each element of the plurality of S-dimensional linear transformed vectors into a digital form.

The step of transforming the plurality of low-dimensional S-sparse sub-vectors into a plurality of S-dimensional linear transformed vectors may further comprise: a step of generating S-dimensional vectors by selecting non-zero elements from each of the plurality of low-dimensional S-sparce sub-vectors; a step of calculating experiential mean value and variance value of the S-dimensional vectors; a step of transforming the S-dimensional vectors into normalized vectors using the experiential mean value and variance value; and a step of transforming the normalized vectors into linear transformed vectors using S-dimensional orthogonal matrix or equivalent matrix thereof.

The S-dimensional orthogonal matrix may be Hadamard matrix or random Gaussian matrix.

The scalar quantization step may be performed based on a quantization level Q that maximizes an optimization objective function in which source vector reconstruction performance is taken into consideration. The quantization level Q may be determined based on allowed communication overhead.

The digital encoding step may further comprise a position encoding step of representing positions, at which S non-zero values are present within the plurality of low-dimensional S-sparse sub-vectors, by a digital bit sequence.

The reconstructing may comprise acquiring an estimated value of a normalized vector from a quantized value vector using minimized mean square error estimation scheme.

The reconstructing may further comprise performing an inverse normalization on the estimated value of the normalized vector using experiential mean value and variance value obtained during a normalization procedure.

According to an exemplary embodiment of the present disclosure, there is disclosed a method for learning of distributed artificial intelligence by a parameter server and local devices, the method comprising: generating, by the parameter server, compressed global model parameter information by compressing parameters of a global model; transmitting, by the parameter server, the compressed global model parameter information to the local devices; reconstructing, by each of the local devices, the parameters of the global model based on the compressed global model parameter information received from the parameter server; and storing, by each of the local devices, the reconstructed parameters of the global model as a local model.

The generating may comprise: a block sparsification step of transforming a high-dimensional global source vector which forms the parameters of the global model, into a plurality of low-dimensional S-sparse sub-vectors; and a digital encoding step of transforming the plurality of low-dimensional S-sparse sub-vectors into a digital bit sequence form.

According to an exemplary embodiment of the present disclosure, there is disclosed an apparatus for learning of distributed artificial intelligence, the apparatus comprising: memory configured to store one or more instructions; and a processor configured to execute the one or more instructions; wherein, by executing the one or more instructions, the processor is further configured to: update parameters of a local model by training the local model based on a local dataset; generate compressed gradient information by compressing gradients of the parameters of the local model; and control a local device to transmit the compressed gradient information to a parameter server, and receive parameters of a global model from the parameter server.

The parameters of the global model received from the parameter server may be compressed information of the parameters of the global model.

The processor may be further configured to: update the parameters of the local model based on the parameters of the global model; and update the parameters of the local model again by training the local model based on a new local dataset.

The processor may be further configured to, when generating the compressed gradient information: transform a high-dimensional local source vector which forms the gradients of the parameters of the local model, into a plurality of low-dimensional S-sparse sub-vectors through a block sparsification process; and transform the plurality of low-dimensional S-sparse sub-vectors into a digital bit sequence form through a digital encoding process.

BRIEF DESCRIPTION OF THE DRAWINGS

FIG. 2 is an operational flowchart showing a method for the learning of a wireless communication-based distributed artificial intelligence system according to an embodiment of the disclosure.

FIG. 2 is a conceptual view showing an example that the frequency resources are allocated by the frequency resource allocation apparatus according to an embodiment of the disclosure.

FIG. 3 is a conceptual view showing the pseudo-code of a Sign Stochastic Gradient Descent (SignSGD) technique as an example of scalar quantization that is used in an embodiment of the disclosure.

FIG. 4 is a conceptual view showing the operation of a vector quantization-based gradient vector compression technique that is used in an embodiment of the disclosure.

FIG. 9 is a conceptual diagram showing the pseudo-code of a Golomb encoding algorithm that is used in one embodiment of the disclosure.

FIG. 10 is a conceptual diagram showing the pseudo-code of a Huffman encoding algorithm that is used in one embodiment of the disclosure.

DETAILED DESCRIPTION

Figure 1:
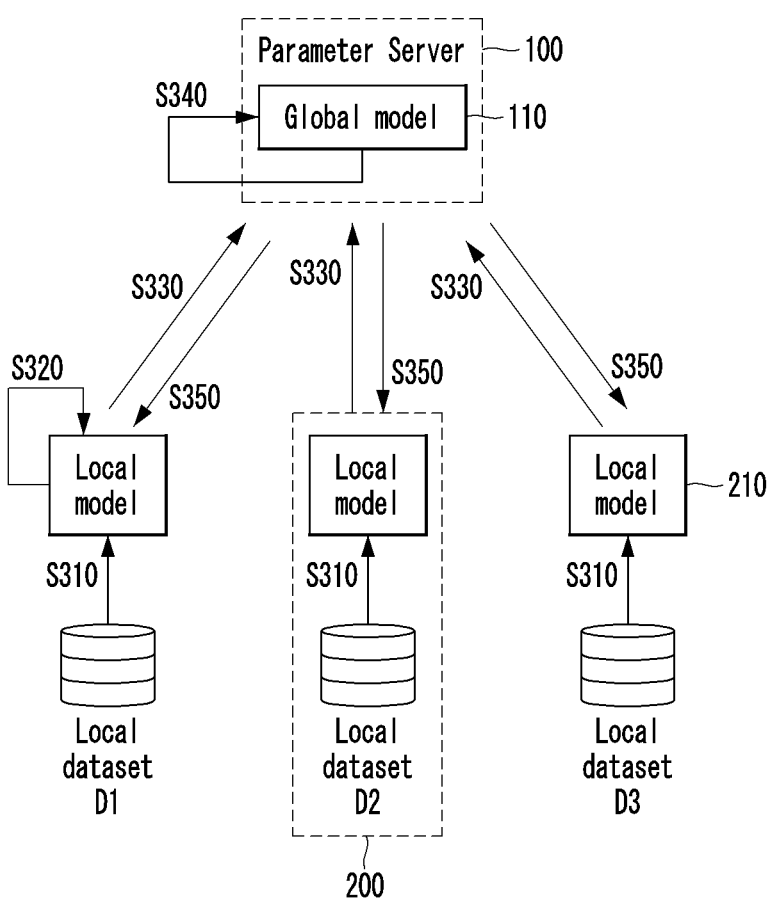
FIG. 1 is a conceptual view showing a wireless communication-based distributed artificial intelligence system and its operation according to an embodiment of the disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that "at least one of A and B" may be used herein to indicate "at least one from among a combination of at least one of A and B" or "at least one of A or B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Since too much detailed description of the related arts may obscure the ideas of the present invention, the detailed explanation of the related art can be omitted. The skilled person can recognize the differentiated feature of the present invention from the related arts, for example, implementing distributed artificial intelligence through federated learning, scalar-based quantization/inverse quantization, vector-based quantization/inverse quantization, a technology for decoding an encoded result through a decoding technique based on an encoding technique, etc.

The matters disclosed in the related arts can be included as a at least a part of the present invention within the scope consistent with the purpose of the present invention.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual view showing a wireless communication-based distributed artificial intelligence system and its operation according to an embodiment of the present invention.

FIG. 2 is an operational flowchart showing a method for the learning of a wireless communication-based distributed artificial intelligence system according to an embodiment of the present invention.

The method for the learning of a model according to the embodiment of the present invention may be implemented in such a manner that a processor that executes one or more instructions stored in memory executes one or more instructions.

The method according to the embodiment of the present invention may be performed on distributed artificial intelligence by local devices 200. A processor executes one or more instructions so that there is performed the method including: updating, by each of the local devices 200, parameters of a corresponding local model 210 by training the local model 210 based on a corresponding local dataset D1, D2, or D3 in step S320; generating, by the local device 200, compressed gradient information by compressing the gradients of the parameters of the local model 210 in step S320; transmitting, by the local device 200, the compressed gradient information to a parameter server 100 in step S330; reconstructing, by the parameter server 100, gradients of the parameters of the local model 210 based on the compressed gradient information received from the local device 200 in step S340; and updating, by the parameter server 100, parameters of a global model 110 based on the reconstructed gradients of the parameters of the local model 210 in step S340.

A processor executes one or more instructions so that there is performed the method including: generating, by the parameter server 100, compressed global model parameters by compressing the parameters of the global model 110 in step S340; transmitting, by the parameter server 100, the compressed global model parameters to the local devices 200 in step S350; reconstructing, by the local devices 200, the parameters of the global model 110 based on the compressed global model parameters received from the parameter server 100 in step S320; and storing, by the local devices 200, the local model 210 by the reconstructed global model parameters, in step S320.

The step of generating compressed gradient information in S320, and/or the step of generating compressed global model parameters in S340 may include: the block sparsification step of transforming a high-dimensional source vector, which forms the gradients of the parameters of the local model 210 and/or the parameters of the global model 110, into a plurality of low-dimensional S-sparse sub-vectors; and the digital encoding step of transforming the plurality of low-dimensional S-sparse sub-vectors into a digital bit sequence form. The global source vector forming the parameters of the global model 110 and/or the local source vector forming the gradients of the parameters of the local model 210 may be transformed into the low-dimensional S-sparse sub-vectors.

Figure 7:
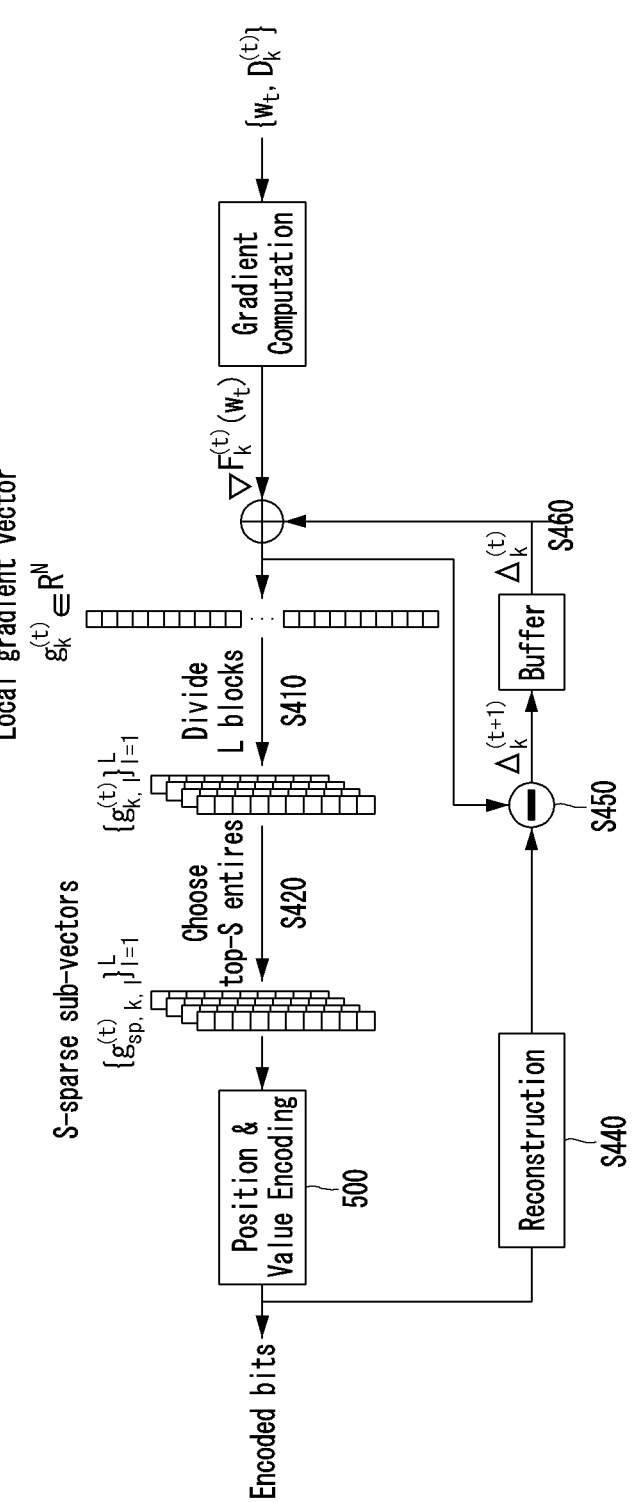
FIG. 7 is a conceptual view showing a gradient compression technology that is used in an embodiment of the disclosure.

The block sparsification step may include: dividing the high-dimensional source vector into L sub-vectors in step S410 of FIG. 7; and generating low-dimensional S-sparse sub-vectors by selecting the S largest elements from among the L sub-vectors and removing residual elements in step S420 of FIG. 7.

The block sparsification step may include: reconstructing the compressed and digitally encoded in the block 500 of FIG. 7; storing the residual elements excluding the reconstructed information (in the step S450 of FIG. 7) from the high dimensional local source vector, and adding the stored residual elements to the high-dimensional local source vector of a next order in step S460 of FIG. 7.

The step S420 of generating low-dimensional S-sparse sub-vectors may be performed in parallel for the L sub-vectors.

The step S420 of generating low-dimensional S-sparse sub-vectors may be performed based on an optimal sparsity level S associated with a quantization level Q that maximizes an optimization objective function in which source vector reconstruction performance is taken into consideration.

The digital encoding step may include: the step S510 and S520 (see FIG. 8) of transforming the plurality of low-dimensional S-sparse sub-vectors into a plurality of S-dimensional linear transformed vectors; and the scalar quantization step S530 (see FIG. 8) of transforming each element of the plurality of S-dimensional linear transformed vectors into a digital form.

The step of transforming the plurality of low-dimensional S-sparse sub-vectors into a plurality of S-dimensional linear transformed vectors of the digital encoding step may further include step of generating S-dimensional vector by selecting non-zero elements from the plurality of the low-dimensional S-Sparse sub-vectors; calculating experiential/empirical mean value and variance value of S-dimensional vectors; transforming the S-dimensional vectors into normalized vector using the experiential/empirical mean value and variance value; transforming the normalized vectors into linear transformed vectors using S-dimensional orthogonal matrix or equivalent matrix thereof.

The S-dimensional orthogonal matrix may be a Hadamard matrix or a random Gaussian matrix.

The scalar quantization step S530 may be performed based on the quantization level Q that maximizes an optimization objective function in which source vector reconstruction performance is taken into consideration.

The quantization level Q may be determined considering an allowed communication overhead.

The digital encoding step may further include the position encoding step of representing the positions, at which S non-zero values are present within the plurality of low-dimensional S-sparse sub-vectors, by a digital bit sequence.

The step of reconstructing, by the parameter server 100, the gradients of the parameters of the local model 210 and/or step of reconstructing, by the local devices 200, the parameters of the global model 110 may include acquiring estimated value of normalized vectors from a quantized gradient and/or parameter value vector using a linear minimized mean square error estimation scheme; performing inverse normalization of the estimated value of the normalized vectors using experiential/empirical mean value and variance value obtained the normalization procedure.

An apparatus for the learning of distributed artificial intelligence according to an embodiment of the present invention includes: memory configured to store one or more instructions; and a processor configured to execute one or more instructions. The processor executes one or more instructions so that it updates parameters of a corresponding local model 210 by training the local model 210 based on a corresponding local dataset D1, D2, or D3, generates compressed gradient information by compressing the gradients of the parameters of the local model 210, and allows a corresponding local device 200 to transmit the compressed gradient information to the parameter server 100 and to receive parameters of the global model 110 from the parameter server 100. The apparatus for the learning of distributed artificial intelligence according to the embodiment of the present invention may be the local device 200 itself.

The parameters of the global model 110 received from the parameter server 100 may be information the parameters of the global model 110 compressed therein.

The processor may update the parameters of the local model 210 based on the parameters of the global model 110, and may update the parameters of the local model 210 again by training the local model 210 based on a new local dataset D1, D2, or D3 (the step S320 is performed again).

When generating the compressed gradient information, the processor may transform a high-dimensional local source vector, forming the gradients of the parameters of the local model 210, into a plurality of low-dimensional S-sparse sub-vectors through a block sparsification process, and may transform the plurality of low-dimensional S-sparse sub-vectors into a digital bit sequence form through a digital encoding process.

When performing the block sparsification process, the processor may divide the high-dimensional local source vector into L sub-vectors in step S410, and may generate low-dimensional S-sparse sub-vectors by selecting the S largest elements from among the L sub-vectors and removing residual elements in step S420.

When performing the block sparsification process, the processor may reconstruct the compressed gradient information from the digitally encoded information, store residual information excluding the reconstructed gradient information from the high dimensional local source vector, adding the stored residual elements to the next order high dimensional local source vector.

The processor may generate the low-dimensional S-sparse sub-vectors based on an optimal sparsity level S associated with a quantization level Q that maximizes an optimization objective function in which source vector reconstruction performance is taken into consideration.

When performing the digital encoding process, the processor may transform the plurality of low-dimensional S-sparse sub-vectors into a plurality of S-dimensional linear transformation vectors, and may transform each element of the plurality of S-dimensional linear transformation vectors into a digital form through a scalar quantization process.

The distributed artificial intelligence system according to the embodiment of the present invention includes: the plurality of local devices 200 configured to store the respective local datasets D1, D2, and D3 and the respective local models 210; and the parameter server 100 configured to store the global model 110.

In the distributed artificial intelligence system according to the embodiment of the present invention, each of the local devices 200 updates parameters of a corresponding local model 210 by training the corresponding local model 210 based on a corresponding local dataset D1, D2, or D3, the local device 200 generates compressed gradient information by compressing the gradients of the parameters of the local model 210, the local device 200 transmits the compressed gradient information to the parameter server 100, the parameter server 100 reconstructs gradients of the parameters of the local model 210 based on the compressed gradient information received from the local device 200, and the parameter server 100 updates parameters of a global model 110 based on the reconstructed gradients of the parameters of the local model 210.

The local device 200 may receive the parameters of the global model 110 from the parameter server 100, may update the parameters of the local model 210 based on the parameters of the global model 110, and may update the parameters of the local model 210 again by training the local model 210 based on a new dataset D1, D2, or D3.

When generating the compressed gradient information, the local device 200 may transform a high-dimensional local source vector which forms the gradients of the parameters of the local model 210, into a plurality of low-dimensional S-sparse sub-vectors through a block sparsification process, and may transform the plurality of low-dimensional S-sparse sub-vectors into a digital bit sequence form through a digital encoding process.

When reconstructing the gradients of the parameters of the local model 210, the parameter server 100 may transform a quantized value vector into a linear form. In this case, a gradient reconstruction process may be performed using the resulting linear vector.

The apparatus and method for the learning of distributed artificial intelligence according to the embodiments of the present invention propose a means for efficiently transmitting gradient information to the remote server 100 after learning using a corresponding local dataset in each of the local devices 200.

The gradient and/or parameter compression, transmission, and reconstruction methods proposed in the present invention may transfer gradient and/or parameter information to a remote network device at a considerably small error level even with a capacity that is considerably small compared to an overall network size. Although the parameter server 100 is shown in the embodiments of FIGS. 1 and 2, the parameter server 100 is not limited to implementation using only one entity, and may be implemented through a cloud-type server or the like.

As a related technology that can be referred to in the implementation of the embodiments of the present invention, federated learning may be mentioned.

Various artificial intelligence technologies are being applied to increase the transmission capacity and speed of communication. The distributed artificial intelligence technology may refer to a key fundamental technology that can be used when the training of an artificial intelligence model is performed based on collaboration with wireless devices.

When the local devices 200 are wireless communication devices and use local data containing privacy information, distributed artificial intelligence may be used to preserve the privacy of the devices.

When a large amount of local data that can be accessed only by the wireless communication devices, which are the local devices 200, is used, the distributed artificial intelligence may be used to avoid overhead required for the transmission of the local data. The distributed artificial intelligence may provide significant advantages in terms of the privacy of the local devices 200 and communication overhead in the learning of an artificial intelligence model.

The distributed artificial intelligence system according to the embodiment of the present invention shown in FIGS. 1 and 2 may train the global model 110 present in the server 100 without the direct transmission of the local datasets that the local devices 200 have.

Instead of directly using the local datasets, the server 100 may receive the local models 210 trained with the local datasets by a plurality of wireless devices, which are the local devices 200, in step S330. Each of the local devices 200 may train a corresponding local model 210 with a corresponding local dataset (see step S310) in step S320. In this case, parameters of the local model 210 may be updated by the above training step S320.

The server 100 may update the global model 110 based on the local models 210 transmitted from the plurality of wireless devices in step S340.

The server 100 may transmit the updated global model 110 to the wireless devices, which are the local devices 200, in step S350.

Each of the wireless devices may train the updated model with its own local dataset (the step S320 is performed again), and may transmit the local model 210, obtained based on this step, to the server 100 again (the step S330 is performed again).

The above process may be repeated until the global model 210 of the server 100 is sufficiently trained. The largest advantage that can be obtained through the above training process is that the server 100 does not need to directly receive the local data of the wireless devices during the training process, so that the privacy of the local devices 200 participating in the training can be preserved. Another advantage is that the optimization of the global model 110 based on various types of information can be performed indirectly without a process of direct upload to the server 100 for the various types of information that can be accessed only by the wireless devices, which are the local devices 200.

A representative strategy used in the distributed artificial intelligence is that the wireless devices and the server 100 exchange the gradient vector information of models. The reason for this is that gradient-based optimization algorithms that perform optimization based on gradient information generated during the update of models are used in many artificial intelligence applications and the key information required in this process is the gradient information of models.

In distributed artificial intelligence, when a model that the server 100 has is represented by a parameter vector $W \in \mathbb{R}^N$, the server 100 may train this parameter vector in a direction that minimizes the loss function of Equation 1 below:

$$F(w) = \frac{1}{|\mathcal{D}|} \sum_{u \in \mathcal{D}} f(w; u) = \frac{1}{\sum_{j=1}^{K} |\mathcal{D}_j|} \sum_{k=1}^{K} \mathcal{D}_k |F_k(w) \tag{1}$$

where K denotes the number of wireless devices, $\mathcal{D}_k$ denotes the local dataset of a k-th device, and $F_k(w)$ denotes the local loss function of the k-th device and may be defined as Equation 2 below, $$F_k(w) = \frac{1}{|\mathcal{D}_k|} \sum_{u \in \mathcal{D}_k} f(w; u) \tag{2}$$

where $f(w; u)$ denotes a loss function for parameter w calculated using individual data u.

If the server 100 uses a gradient-based optimization algorithm, the information required in a t-th iteration is a gradient vector for a current parameter vector and may be defined as Equation 3 below:

$$\nabla F(w_t) = \frac{1}{|\mathcal{D}|} \sum_{u \in \mathcal{D}} \nabla f(w_t; u) \tag{3}$$

where $w_t \in \mathbb{R}^N$ denotes a parameter vector obtained up to the t-th iteration.

According to the above definitions, the distributed artificial intelligence based on gradient transmission may include the following process. In the t-th iteration, each of the wireless devices May calculate the gradient vector of Equation 4 below based on its own local dataset:

$$\nabla F_k^{(i)}(w_t) = \frac{1}{|\mathcal{D}_k^{(t)}|} \sum_{u \in \mathcal{D}_k^{(t)}} \nabla f(w_t; u) \tag{4}$$

where $$\mathcal{D}_k^{(t)}$$

denotes the local dataset used by the k-th device in the t-th iteration to calculate gradients, and this dataset is a subset of $\mathcal{D}_k$.

Each of the wireless devices may calculate the gradient vector and then transmit information about the vector to the server 100. Thereafter, in the t-th iteration, the server 100 may collect information about local gradient vectors transmitted by the wireless devices and determine a global gradient vector using Equation 5 below:

$$\nabla F(w_t) = \sum_{k=1}^{K} \rho_k^{(t)} \nabla F_k^{(t)}(w_t), \quad \rho_k^{(i)} \triangleq \frac{|\mathcal{D}_k^{(i)}|}{\sum_{j-1}^{K} |\mathcal{D}_j^{(t)}|} \tag{5}$$

After calculating the global gradient vector, the server 100 determines a (t+1)-th parameter vector by updating the global model 110 based on the global gradient vector. A strategy of exchanging the update information of the local model 210 instead of gradient information may also be used, and this strategy may also be basically represented by a process equivalent to the process for the gradient information transmission strategy.

The most important task in the realization of a wireless communication-based distributed artificial intelligence technology is to reduce the communication overhead required when each wireless device transmits a local gradient vector. The communication overhead required for the transmission of the gradient vector is determined according to the number of parameters. In artificial intelligence applications that can be considered in a wireless communication system, the global model 110 may include thousands or tens of thousands of parameters. In this case, significant communication overhead is caused for the transmission of a gradient vector.

Scalar Quantization-Based Gradient Vector Compression

FIG. 3 is a conceptual view showing the pseudo-code of a Sign Stochastic Gradient Descent (SignSGD) technique as an example of scalar quantization that is used in an embodiment of the present invention.

In the technique of FIG. 3, there is used an n-bit scalar quantizer that compresses 32 bits, occupied by each element in a gradient vector, into n bits smaller than 32 bits. The scalar quantizer analyzes the distribution of the real-valued elements of 32 bits and compresses them into $2^n$ types of n-bit symbols. In this case, as n, which is a quantization bit, decreases, communication overhead decreases linearly. After receiving the quantized gradient vector of each device, the server 100 transforms it back into a real value through a shared quantizer and trains the global model 110. The scalar quantization technique has the complexity which increases linearly with the length of a gradient vector, and has the advantage in which the device and the server 100 only need to share a quantizer. However, there is a disadvantage in that a quantization error occurs as much as compressing a 32-bit real value into n bits. SignSGD may be cited as an example of the usage of the scalar quantization technique. FIG. 3 shows the algorithm of SignSGD. As can be seen through the algorithm, SignSGD receives a gradient vector from each device and then encodes it into 1 if the sign of each element is + and into −1 if the sign is −. In other words, it may be considered to be a 1-bit quantizer. The server 100 adds all the gradient vectors received from the respective devices, and transforms the result of the addition into 1 if the sign is + and into −1 if the sign is −.

Vector Quantization-Based Gradient Vector Compression

Figure 4:
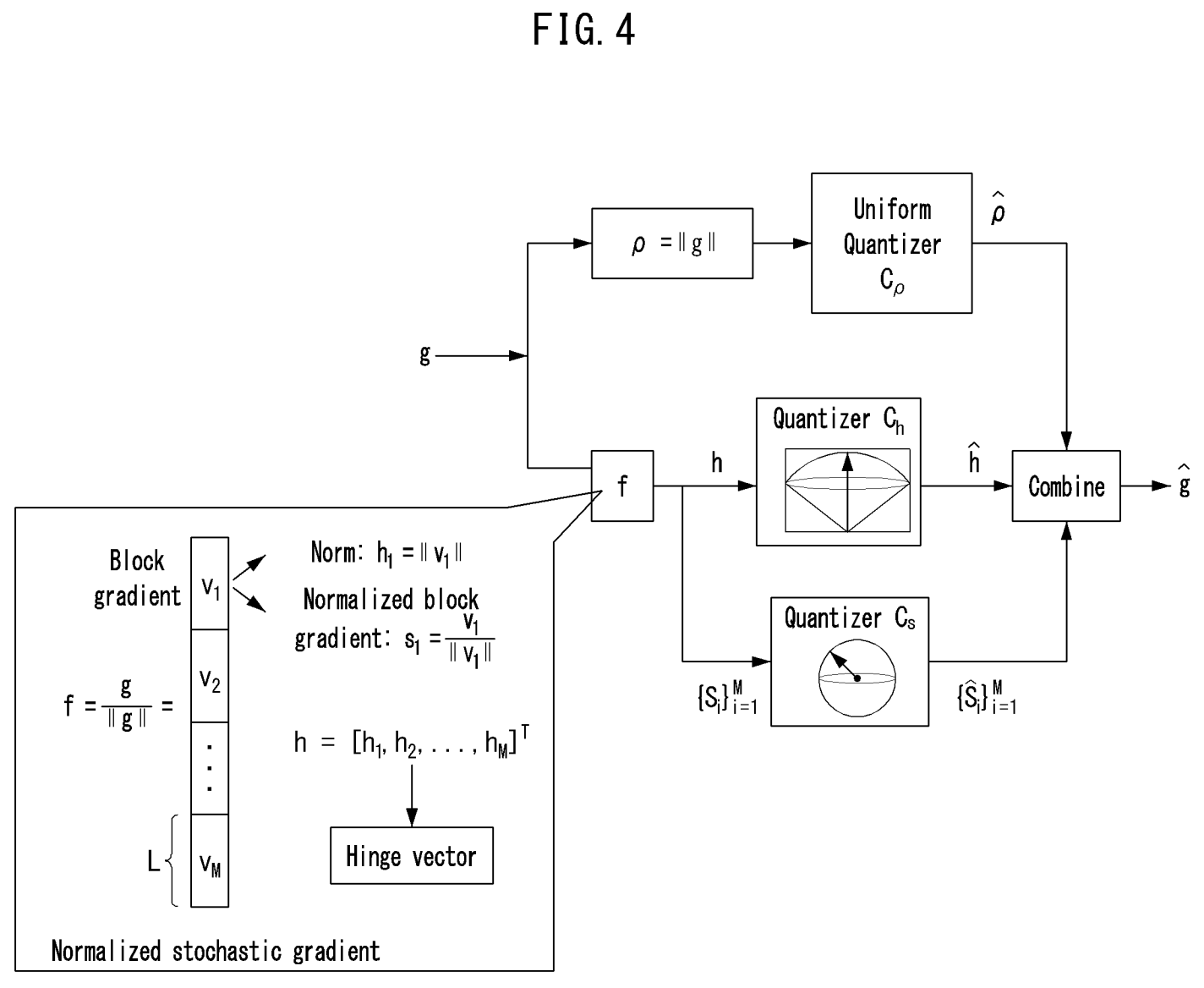

FIG. 4 is a conceptual view showing the operation of a vector quantization-based gradient vector compression technique that is used in an embodiment of the present invention.

In the technique of FIG. 4, a high-dimensional gradient vector is divided into vector magnitudes and low-dimensional vectors, and the vector magnitudes and the low-dimensional vectors are compressed using a scalar quantizer and a vector quantizer, respectively. The index values of the low-dimensional vectors encoded using the vector quantizer are transmitted from the device to the server 100, and the server 100 generates quantized low-dimensional vectors by decoding received index values. Then, the generated low-dimensional vectors become a quantized high-dimensional gradient vector through scaling and concatenation processes. Thereafter, the server 100 averages the quantized high-dimensional gradient vectors of the respective devices, and trains the neural network/global model 110 using the results of the averaging. The vector quantization has the advantage of less quantization error compared to the scalar quantization. However, this gain involves the complexity that increases exponentially with the length of a vector. Furthermore, when vector quantization is used, there may be the prerequisite that the device and the server 100 have to share a codebook in advance.

Sparsification-Based Gradient Vector Compression

Figures 5, 6:
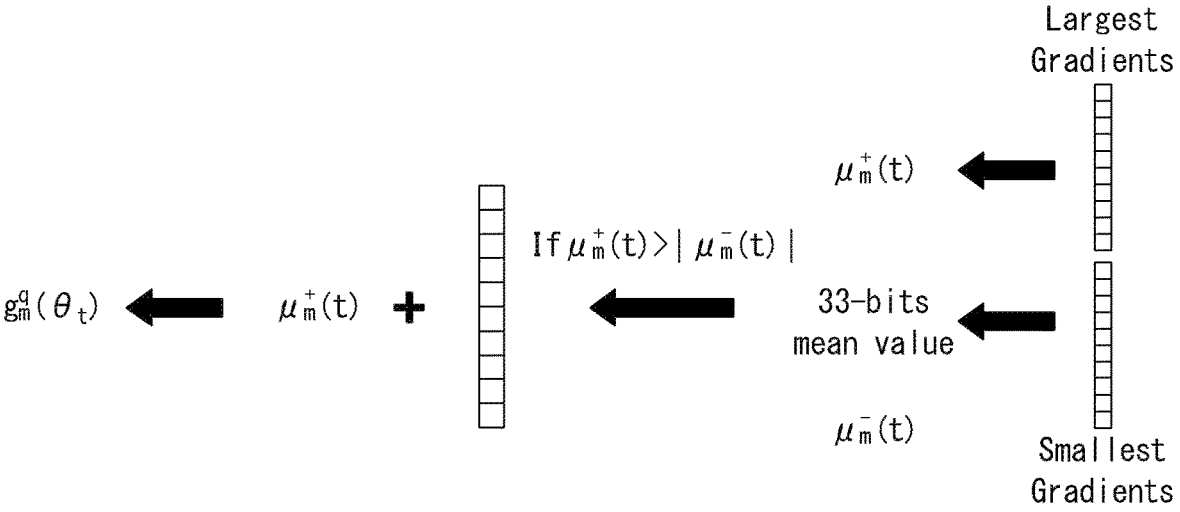
FIG. 5 is a conceptual view showing the pseudo-code of a sparsification technique that is used in an embodiment of the disclosure.
FIG. 6 is a conceptual view showing the operation of a D-DSGD technique as an example of a digital encoding technique that is used in an embodiment of the disclosure.

FIG. 5 is a conceptual view showing the pseudo-code of a sparsification technique that is used in an embodiment of the present invention.

In the technique of FIG. 5, only S elements having large absolute values out of the elements of a gradient vector are transmitted. Elements having large absolute values out of the elements of a gradient vector are interpreted as important values in the learning of an artificial intelligence model. Accordingly, even when only these elements are transmitted, a significant loss in learning performance may be prevented. In this case, elements having small absolute values are not discarded, the elements that have not been transmitted are added in a subsequent communication round, and then sparsification is performed again. The sparsification technique of FIG. 5 is divided into a digital encoding technique and a compressed sensing technique.

The digital encoding-based sparsification technique is a technique that first generates a sparse vector by sparsifying a gradient vector and then transmits the position information of non-zero element values. In other words, when sparsification is performed, only S elements having large absolute values remain in each communication round, and the residual elements are set to a value of 0. In this case, communication overhead is reduced by transmitting the positions of non-zero elements. In particular, a D-DSGD technique may be cited as an example of the usage of the digital encoding-based sparsification technique.

FIG. 6 is a conceptual view showing the operation of a D-DSGD technique as an example of a digital encoding technique that is used in an embodiment of the present invention.

Referring to FIG. 6, when the length of a gradient vector is N, a sparse vector is generated using only S elements of the gradient vector having large values out of positive values in each communication round of a wireless device, and at the same time, a sparse vector is generated using elements having large absolute values out of negative values in the same manner. In this case, each of the two vectors has S elements having non-zero absolute values, and the mean value of the positive sparse vector elements and the absolute value of the mean value of the negative sparse vector elements are compared with each other. In this case, when the mean value of the positive sparse vector elements is larger, the positions of non-zero positive sparse vector elements are transmitted along with 33-bit information containing a 32-bit real value and 1-bit sign information. In contrast, when the absolute value of the mean value of the negative sparse vector elements is larger, the 33-bit mean value information of the negative sparse vector elements and the positions of the elements are transmitted. Thereafter, the device repeats the task in which the negative or positive sparse vector elements that have not been transmitted are added in a subsequent communication round and then sparsification is performed again.

The transmission/reception technology using the sparsification/quantization-based gradient compression proposed by the present invention may effectively overcome the communication overhead problem of distributed artificial intelligence. Various gradient vector compression technologies that have been proposed in the past are problematic in that they have limitations in reducing communication overhead or cannot guarantee accurate source vector reconstruction in the server 100.

In order to overcome the limitations of the conventional technologies, the transmission technology using sparsification/quantization-based gradient compression proposed in the present invention flexibly deals with communication overhead requirements and includes a compression technique capable of determining optimal parameters according to the accuracy of source vector reconstruction. The proposed reception technology includes a compression reconstruction technique by which the server 100 can accurately reconstruct an original local gradient vector from compressed information received from the wireless device.

Gradient Compression Technology Proposed in the Disclosure

The lossy compression of local gradients is a practical solution to a reduction in message size for each round of communication, and compression may be performed through sparsification or quantization. Despite significant progress in the improvement of communication efficiency through compression, the conventional studies do not take into consideration the aggregation of local gradients through the joint acceptance of heterogeneous local data distribution, and various communication link reliabilities and quantification effects for each device. Since most conventional studies mainly focus on approaches to the design of separate communication and learning systems, they decode local gradients and aggregate them independently.

Over-the-air-aggregation is a new paradigm for jointly designing communication and learning systems by utilizing the overlapping characteristics of wireless media. This approach opens up new opportunities for jointly designing wireless communication and learning systems, but is limited to time-division duplex wireless communication systems in which channel state information can be used for uplink transmission in a mobile device.

FIG. 7 is a conceptual view showing a gradient compression technology that is used in an embodiment of the present invention.

Referring to FIG. 7, the proposed gradient compression technology includes two processes: a block sparsification process S410 and S420 and a digital encoding process 500. A description of the block sparsification process S410 and S420 of the two processes is given as follows. The purpose of the block sparsification process S410 and S420 is to transform a high-dimensional local gradient vector into L low-dimensional S-sparse sub-vectors. To this end, each wireless device divides a local gradient vector into L sub-vectors in step S410, and generates S-sparse sub-vectors by selecting only the S largest elements for each of the sub-vectors and also removing residual elements in step S420.

In a block sparsification process according to an embodiment of the present invention, to prevent information loss that may occur during the sparsification process, there may be included the process of reconstructing (see step S440) the digitally encoded and compressed information, the process of excluding (see step S450), and the process (see step S460) of storing the residual elements resulted from the step S450 in a buffer in advance and adding the residual elements to a subsequent gradient vector. Although a sparse vector generation process similar to the above process was proposed through conventional studies, the block sparsification process proposed in the present invention has two distinct points compared to the conventional technologies. First, in the present invention, by applying L dimension divisions, not only can the overall process be performed in parallel, but also loss attributable to error that may occur in a subsequent digital encoding process may be significantly prevented. Second, in the present invention, an optimal S value that can maximize reconstruction performance is determined through an optimization process in which gradient reconstruction performance is taken into consideration. The process of determining an optimal S value may be implemented by a gradient compression optimization technology to be described later.

Figure 8:
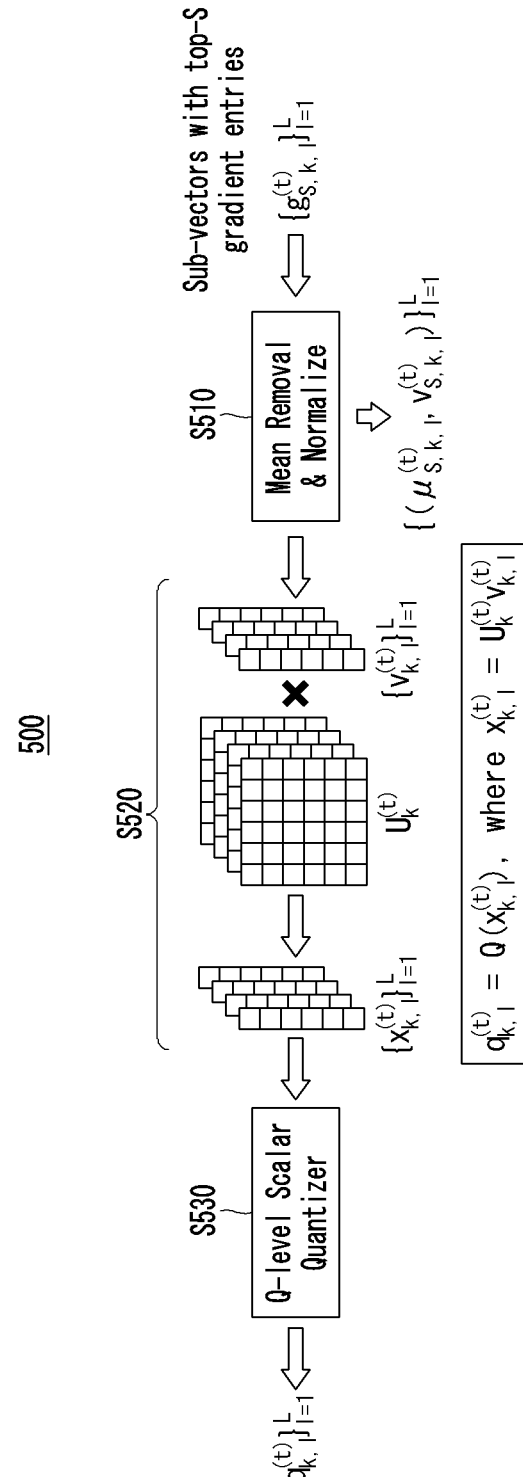
FIG. 8 is a conceptual view showing the digital encoding process 500 that is used in one embodiment of the present invention.

FIG. 8 is a conceptual view showing the digital encoding process 500 that is used in one embodiment of the present invention.

Referring to FIG. 8, in the digital encoding process 500, transformation may be performed to represent L S-sparse sub-vectors, obtained through the block sparsification process S420, in the form of a digital bit sequence. In the proposed digital encoding process 500, position encoding for representing the positions of S elements and value encoding for representing S element values are performed separately.

In FIG. 8, $$g_{S,k,l}^{(t)}$$

is an S-dimensional vector newly defined by collecting only S non-zero values from $$g_{sp,k,l}^{(t)},$$

which is an l-th S-sparse sub-vector. As can be seen from FIG. 8, the proposed value encoding process includes a total of three steps.

First step S510: In the digital encoding process 500 according to an embodiment of the present invention, the empirical mean and variance for each vector $$g_{S,k,l}^{(t)}$$

may be calculated using Equation 6 below:

$$\mu_{S,k,l}^{(t)} = 1_S^T g_{S,k,l}^{(t)}/S \tag{6}$$

$$v_{S,k,l}^{(t)} = \left\| g_{S,k,l}^{(t)} - \mu_{S,k,l}^{(t)} 1_S \right\|^2 / S$$

In the digital encoding process 500 according to an embodiment of the present invention, a normalized vector $$v_{k,l}^{(t)}$$

having a mean of 0 and a variance of 1 may be generated using Equation 7 below:

$$v_{k,l}^{(t)} = \left( g_{S,k,l}^{(t)} - \mu_{S,k,l}^{(c)} 1_S \right)/\sqrt{v_{S,k,l}^{(t)}} \tag{7}$$

Second step S520: In the digital encoding process 500 according to an embodiment of the present invention, a linear transformation vector $$x_{k,l}^{(t)}$$

may be generated by transforming a vector $$v_{k,l}^{(t)},$$

normalized through the linear product of a S-dimensional orthogonal matrix $$U_k^{(t)},$$

as shown in Equation 8 below:

$$x_{k,l}^{(t)} = U_k^{(t)} v_{k,l}^{(t)} \tag{8}$$

In Equation 8, various orthogonal matrices such as a Hadamard matrix and a random Gaussian matrix, or matrices corresponding thereto may be used to determine the S-dimensional orthogonal matrix $$U_k^{(t)}.$$

Third step S530: In the digital encoding process 500 according to an embodiment of the present invention, each element of the linear transformation vector $$x_{k,l}^{(t)}$$

may be transformed into a digital form using a scalar quantizer. In this case, a quantized vector may be represented as in Equation 9 below:

$$q_{k,l}^{(t)} = Q(x_{k,l}^{(t)}) \tag{9}$$

When the scalar quantizer used in the value encoding process has Q quantization levels, each element of $$x_{k,l}^{(t)}$$

may be represented by bits of $\log_2 Q$. Accordingly, when the value encoding process proposed in the present invention is applied, each S-sparse sub-vector $$g_{S,k,l}^{(t)}$$

may be transformed into $B_{val} = S \log_2 Q$ bits. Position encoding may be performed by representing the positions, at which S non-zero values out of N (which is the total number of elements of each sub-vector) elements are present, by a digital bit sequence. In this case, the following three encoding techniques may be taken into consideration for the position encoding.

Combination-based encoding: This is a method of taking into consideration all possible combinations of the selections of S elements from among all N elements, selecting a combination to which a current sub-vector is matched, and then sending a corresponding index. The bit overhead required in this case is represented as in Equation 10 below:

$$B_{pos} = \log_2 \binom{N}{S} \tag{10}$$

Golomb encoding: FIG. 9 is a conceptual diagram showing the pseudo-code of a Golomb encoding algorithm that is used in one embodiment of the present invention.

The bit overhead required in the Golomb encoding performed with reference to FIG. 9 is as shown in Equation 11 below:

$$B_{pos} = S\left(b^* + \frac{1}{1 + (1 - S/N)^{2^{b*}}}\right),$$

$$b^* = 1 + \left\lfloor \log_2 \frac{\log_2(\phi - 1)}{\log_2(1 - S/N)} \right\rfloor, \phi = \frac{\sqrt{5} + 1}{2} \tag{11}$$

Huffman encoding: FIG. 10 is a conceptual diagram showing the pseudo-code of a Huffman encoding algorithm that is used in one embodiment of the present invention.

When combination-based position encoding is used for gradient compression in the distributed artificial intelligence system according to an embodiment of the present invention, the bit overhead required for the transmission of a local gradient vector may be obtained, as shown in Equation 12 below:

$$B_{tot} = L(B_{pos} + B_{val}) = L\left\{\log_2\binom{N}{S} + S\log_2 Q\right\} \tag{12}$$

Gradient Reconstruction Technology Proposed in the Disclosure

The gradient reconstruction technology proposed in the present invention and performed in the server 100 is as follows. When the wireless devices use the gradient compression process described above, it may be assumed that the server 100 can completely reconstruct position information because the position information of S gradient elements for each sparse sub-vector has undergone a lossless encoding process. Accordingly, the part requiring accurate gradient reconstruction in the server 100 may be information about the values of the S gradient elements in each sparse sub-vector. Since the values of these gradient elements are observed in the server 100 in the form of a quantized vector $$q_{k,l}^{(t)},$$

it is necessary to reconstruct S gradient value vectors $$g_{S,k,l}^{(t)}$$

from the quantized vector. To this end, well-known Bussgang's theory is used in the gradient reconstruction technology proposed in the present invention. According to Bussgang's theory, a non-linear quantization process may be transformed into a linear form. According to Bussgang's theory, when an input vector $$x_{k,l}^{(t)}$$

of the quantizer is a Gaussian vector having independent elements and also having an element mean of 0 and a variance of 1, it can be proven that a quantized vector is represented as in Equation 13 below:

$$q_{k,l}^{(t)} = Q\left(x_{k,l}^{(t)}\right) = \gamma_Q x_{k,l}^{(t)} + d_{k,l}^{(t)} = \gamma_Q U_k^{(t)} v_{k,l}^{(t)} + d_{k,l}^{(t)} \tag{13}$$

In Equation 13 above, the correlation between $$x_{k,l}^{(t)}$$

and $$d_{k,l}^{(t)}$$

is 0, and the constant $\gamma_Q$ is calculated as in Equation 14 below:

$$\gamma_Q = \sum_{i=1}^{Q} \frac{q_i}{\sqrt{2\pi}} \left\{ \exp\left(-\frac{\tau_{i-1}^2}{2}\right) - \exp\left(-\frac{\tau_i^2}{2}\right) \right\} \tag{14}$$

In Equation 14 above, $q_i$ and $\tau_i$ denote the i-th quantization value and threshold of the quantizer used in the wireless device, respectively. In addition, the covariance matrix of $$d_{k,l}^{(t)}$$

is calculated as in Equation 15 below:

$$R_{d_{k,l}^{(t)}} = \left(\psi_Q - \gamma_Q^2\right) I_S, \psi_Q = \sum_{i=1}^{Q} q_i^2 \{\Phi(\tau_i) - \Phi(\tau_{i-1})\} \tag{15}$$

In Equation 15 above, $\Phi(x)$ represents the cumulative distribution function of a normal random variable.

$$R_{d_{k,b}^{(t)}}$$

is the covariance matrix of $$d_{k,l}^{(t)},$$

and $I_s$ an S-dimensional identity matrix (a diagonal matrix in which S main diagonal elements are 1 and the residual elements are 0).

In fact, when an original gradient vector is linearly transformed through a random Gaussian matrix in the gradient compression technology proposed in the present invention, $$x_{k,l}^{(t)}$$

may be modeled as a Gaussian vector having independent elements and also having an element mean of 0 and a variance of 1. Accordingly, it may be possible to transform a quantized vector into a linear form through Bussgang's theory described above.

In the proposed gradient reconstruction technology, a linear least mean square error estimation technique is applied based on the fact that a quantized vector can be represented in a linear form. In order to specify this estimation technique, it is assumed that a linear received signal is obtained as in Equation 16 below:

$$q = \gamma_Q U v + d \tag{16}$$

where q is an arbitrary quantized received signal vector, U is an arbitrary orthogonal matrix, v is an arbitrary normalized vector, and d is an arbitrary vector.

When the vector v is estimated from the linear received signal of Equation 16 by using the linear least mean square error technique, the estimated value 1 of vector v may be obtained as in Equation 17 below:

$$\hat{v} = Fq, \quad F = \underset{F}{\arg\min} \, E\big[\|v - Fq\|^2\big] = R_{vq} R_q^{-1} \tag{17}$$

where $R_{vq}$ is the cross-covariance matrix of vectors v and q, and $R_q^{-1}$ is the inverse matrix of the covariance matrix of vector q.

In this case, the estimation error is calculated as in Equation 18 below:

$$E\big[\|v - \hat{v}\|^2\big] = Tr[R_v] - Tr\big[R_{vq} R_q^{-1} R_{qv}\big] \tag{18}$$

where the Tr operator denotes a diagonal sum (the sum of diagonal elements), $R_v$ is the covariance matrix of vector v, $R_q$ is the covariance matrix of vector q, $R_{vq}$ is the cross-covariance matrix of vectors v and q, and $R_{qv}$ is the cross-covariance matrix of vectors q and v.

The covariance matrices required for determining the above estimated value and calculating error are calculated as in Equation 19 below when the correlation between v and d is 0.

$$R_{vq} = \gamma_Q R_v U^T, \quad R_q = \gamma_Q^2 U R_v U^T + R_d \tag{19}$$

When $R_v = I_s$ and $$R_d = \big(\psi_Q - \gamma_Q^2\big) I_S$$

20 are satisfied, the estimated value and estimation error of the linear least mean square error technique may be represented in a simple form as in Equation 20 below:

$$\hat{v} = \frac{\gamma_Q}{\psi_Q} U^T q, \quad E\big[\|v - \hat{v}\|^2\big] = S\bigg(1 - \frac{\gamma_Q^2}{\psi_Q}\bigg) \tag{20}$$

Based on the above results, in the proposed gradient reconstruction technology, a linear expression is obtained by applying Bussgang's theory to quantized vector $$q_{k,l}^{(t)},$$

and then an estimated value for normalized vector $$v_{k,l}^{(t)}$$

may be determined by applying the linear least mean square error estimation technique as in Equation 21 below:

$$\hat{v}_{k,l}^{(t)} = \frac{\gamma_Q}{\psi_Q} \big(U_k^{(t)}\big)^T q_{k,l}^{(t)} \tag{21}$$

Finally, under the assumption that the empirical mean and variance values used in the gradient compression normalization step are received separately, gradient vector $$g_{S,k,l}^{(t)}$$

is estimated using the mean and variance values as in Equation 22 below:

$$\hat{g}_{S,k,l}^{(t)} = \sqrt{v_{S,k,l}^{(t)}} \, \hat{v}_{S,k,l}^{(t)} + \mu_{S,k,l}^{(t)} = \frac{\gamma_Q}{\psi_Q} \sqrt{v_{S,k,l}^{(t)}} \big(U_k^{(t)}\big)^T q_{k,l}^{(t)} + \mu_{S,k,l}^{(t)} \tag{22}$$

where $$v_{S,k,l}^{(t)}$$

is the separately transmitted empirical standard deviation of the gradient vector, and $$\mu_{S,k,l}^{(t)}$$

is the separately transmitted empirical mean of the gradient vector.

The estimation error generated in this case may be calculated as in Equation 23 below.

$$E\big[\|g_{S,k,l}^{(t)} - \hat{g}_{S,k,l}^{(t)}\|^2\big] = v_{S,k,l}^{(t)} E\big[\|v_{k,l}^{(t)} - \hat{v}_{k,l}^{(t)}\|^2\big] = v_{S,k,l}^{(t)} S\bigg(1 - \frac{\gamma_Q^2}{\psi_Q}\bigg) \tag{23}$$

Gradient Compression Optimization Technology Proposed in the Disclosure

The performance of the gradient reconstruction technology may be maximized through the optimization of the quantization level Q and the sparsity level S that are used in the gradient compression technology proposed in the present invention. If only communication overhead $C_k$ is allowed for a k-th wireless device, a problem of optimization for the parameters Q and S minimizing the gradient reconstruction error of the server 100 may be defined as in Equation 24 below:

$$(Q_k^*, S_k^*): \min_{Q,S} \mathbb{E}\left[\|g_k - \hat{g}_k\|^2\right] \tag{24}$$

$$\text{s.t. } B_{tot} \le C_k$$

where $g_k$ is a local gradient vector, and $\hat{g}_k$ is the estimated value of $g_k$.

Equation 24 above may result in a problem of optimization that minimizes the estimation error of a local gradient vector for the quantization level Q and the sparsity level S.

If the combination-based position encoding is used in the above equation, the maximum sparsity level $$S_Q^*$$

or transmittable sparsity level S for a fixed quantization level Q may be determined as in Equation 25 below with reference to Equation 12 above:

$$S_Q^* = \arg\max_S S \text{ s.t. } C_k \ge L\left\{\log_2\binom{N}{S} + S\log_2 Q\right\} \tag{25}$$

By substituting the above result into the original optimization problem (Equation 24), the optimization problem may be re-represented as in Equation 26 below:

$$(Q_k^*, S_k^*)\min_Q\left\{\min_{S \le S_Q^*}\mathbb{E}\left[\|g_k - \hat{g}_k\|^2\right]\right\} \tag{26}$$

When the block sparsification process used in the proposed gradient compression technology is taken into consideration, the objective function of the above optimization problem may be calculated as in Equation 27 below:

$$\mathbb{E}\left[\|g_k - \hat{g}_k\|^2\right] = \sum_{l=1}^L \mathbb{E}\left[\|g_{k,l} - \hat{g}_{k,l}\|^2\right] \tag{27}$$

$$\mathbb{E}\left[\|g_{k,l} - \hat{g}_{k,l}\|^2\right] = \mathbb{E}\left[\|g_{k,l} - g_{sp,k,l}\|^2\right] + \mathbb{E}\left[\|g_{S,k,l} - \hat{g}_{S,k,l}\|^2\right] =$$

$$\mathbb{E}\left[\|g_{k,l}\|^2\right] - \mathbb{E}\left[\|g_{S,k,l}\|^2\right] + v_{S,k,l}S\left(1 - \frac{\gamma_Q^2}{\psi_Q}\right)$$

Based on the above result, the optimal sparsity level S for the fixed quantization level Q results in the optimization problem of Equation 28 below:

$$S_k^* = \tag{28}$$

$$\arg\min_{S \le S_Q^*}\mathbb{E}\left[\|g_k - \hat{g}_k\|^2\right] = \arg\max_{S \le S_Q^*}\sum_{l=1}^L\left\{\mathbb{E}\left[\|g_{S,k,l}\|^2\right] - v_{S,k,l}S\left(1 - \frac{\gamma_Q^2}{\psi_Q}\right)\right\}$$

It is a considerably difficult problem to find a closed-form solution to the problem of Equation 28 above. To solve this problem, it is assumed that the S largest elements of a gradient vector operate like independent random variables, and thus their mean value is assumed to be 0. Under this assumption, the optimization problem for finding the sparsity level S may be solved in a simpler form as shown in Equation 29 below:

$$S_k^* = \arg\max_{S \le S_Q^*}\frac{\gamma_Q^2}{\psi_Q}\sum_{l=1}^L\mathbb{E}\left[\left\|g_{S_Q^*,k,l}\right\|^2\right] = S_Q^* \tag{29}$$

Using the above result, the optimal quantization level may be easily calculated using Equation 30 below:

$$Q_k^* = \arg\max_Q\frac{\gamma_Q^2}{\psi_Q}\sum_{l=1}^L\mathbb{E}\left[\left\|g_{S_Q^*,k,l}\right\|^2\right] = \arg\max_Q\frac{\gamma_Q^2}{\psi_Q}\sum_{l=1}^L v_{S_Q^*,k,l}S_Q^* \tag{30}$$

In the above optimization problem, a quantization level having a maximum value and a maximum sparsity level in that case may be determined to be optimal parameters of the proposed gradient compression technology.

Gradient compression, transmission, and reconstruction method proposed in the present invention may be applied to procedure for transmitting global model parameters of the parameter server to local devices.

Figure 11:
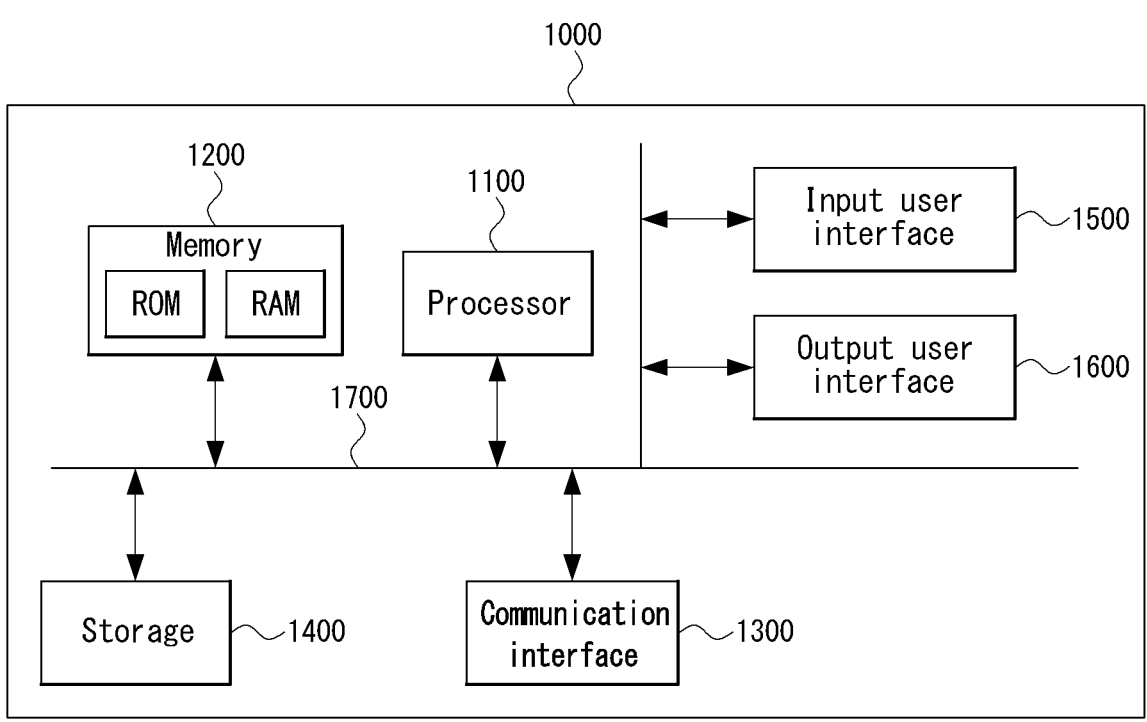
FIG. 11 is a conceptual diagram showing an example of a generalized distributed artificial intelligence system, a device for the learning of distributed artificial intelligence (the local device 200/the parameter server 100), or a computing system that is capable of performing at least some of the processes of FIGS. 1 to 10.

FIG. 11 is a conceptual diagram showing an example of a generalized distributed artificial intelligence system, a device for the learning of distributed artificial intelligence (the local device 200/the parameter server 100), or a computing system that is capable of performing at least some of the processes of FIGS. 1 to 10.

At least some processes of a method for the learning of distributed artificial intelligence according to an embodiment of the present invention may be performed by the computing system 1000 of FIG. 11.

Referring to FIG. 11, the computing system 1000 according to an embodiment of the present invention may include a processor 1100, a memory 1200, a communication interface 1300, a storage device 1400, an input interface 1500, and an output interface 1600 and a system bus 1700.

The computing system 1000 according to an embodiment of the present invention may include at least one processor 1100 and a memory 1200 stores instructions for invoking the at least one processor 1100 to perform at least one step of the method according to an embodiment of the present invention The at least one step of the method may be performed by the at least one processor 1100 loading and executing instructions from the memory 1200.

The processor 1100 may imply a central processing unit (CPU), a graphics processing unit (GPU), or a dedicated processor on which methods according to embodiments of the present invention can be performed.

Each of the memory 1200 and the storage device 1400 may be configured as at least one of a volatile storage medium and a non-volatile storage medium. For example, the memory 1200 may be configured as at least one of a read only memory (ROM) and a random access memory (RAM).

The computing system 1000 may include a communication interface 1300 for performing communication through a wireless network.

The computing system 1000 may further include a storage device 1400, an input interface 1500, an output interface 1600, and the like.

In addition, each component included in the computing system 1000 may be connected by a bus 1700 to communicate with each other.

For example, a computer system 1000 can be implemented as at least one of a communicable desktop computer, a laptop computer, a notebook, a smart phone, a tablet PC, a mobile phone, mobile phone, smart watch, smart glass, e-book reader, PMP (portable multimedia player), portable game console, navigation device, digital camera, DMB (digital multimedia broadcasting) player, digital audio recorder, digital audio player, digital video recorder, digital video player, PDA (Personal Digital Assistant), etc.

Each of the distributed artificial intelligence system according to an embodiment of the present invention and the parameter server 100 and the local device 200 constituting the system includes memory 1200 configured store one or more instructions, and a processor 1100 configured to execute one or more instructions. The processor 1100 executes one or more instructions, thereby controlling a process in which the distributed artificial intelligence system/device updates parameters of each local model 210 based on a corresponding local dataset, receives parameters of the global model 110 from the server 100, and updates parameters of the local model 210.

The local dataset may be stored in the storage device 1400 and/or the memory 1200.

The local model 210 may also be stored in the storage device 1400 and/or the memory 1200. More specifically, the local dataset or local model 210 may be loaded into a cache in the memory 1200 or processor 1100 in response to the request of the processor 1100 capable of electronically communicating with the storage device 1400 and/or the memory 1200 in the state of being stored in the storage device 1400.

The processor 1100 may control the local model 210 so that the local model 210 learns the local dataset in step S310, and may perform control so that the parameters inside the local model 210 are updated by learning in step S320.

The processor 1100 may update internal parameters of the local model 210 using parameters of the global model 110 received from the server 100 via a communication interface 1300 in step S350.

The processor 1100 controls the updated local model 210 so that it performs re-learning based on a newly generated local dataset in step S310, and may perform control so that the internal parameters of the local model 210 are updated again by re-learning in step S320.

Neural network models according to embodiments of the present invention are defined by parameter sets stored in the memory 1200 and/or storage 1400 capable of communicating electronically with the processor 1100, and may perform tasks given to the respective models in collaboration with the processor 1100.

According to an embodiment of the present invention, it may be possible to effectively solve common problems regarding the securement of learning data and the privacy of learning data, which are required by existing intelligent wireless communication technologies, thereby improving the possibility of introduction and application range of intelligent communication technologies.

According to an embodiment of the present invention, it may be possible to reduce the communication load generated in a process for the learning of a distributed artificial intelligence model and to reduce the consumption of communication resources for the transmission of learning data.

According to an embodiment of the present invention, it may be possible to improve the performance of increasing the transmission capacity of various intelligent wireless communication technologies in the situation where communication overhead is limited.

The method according to an embodiment of the present disclosure may be implemented as a computer-readable program or code on computer-readable recording media. Computer-readable recording media include all types of recording devices in which data readable by a computer system are stored. The computer-readable recording media may also be distributed in a network-connected computer system to store and execute computer-readable programs or codes in a distributed manner.

The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present disclosure have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device, e.g., a field programmable gate array, may be used to perform some or all of the functions of the methods described herein. In embodiments, the field programmable gate array may operate in conjunction with a microprocessor to perform one of the methods described herein. In general, the methods are preferably performed by a certain hardware device.

Although described above with reference to the preferred embodiments of the present disclosure, it should be understood that those skilled in the art can variously modify and change the present disclosure within the scope without departing from the spirit and scope of the present disclosure as set forth in the claims below.

What is claimed is:

1. A method for learning of distributed artificial intelligence by a local device, the method comprising:
updating, by the local device, parameters of a corresponding local model by training the local model based on a corresponding local dataset;

generating, by the local device, compressed gradient information by compressing gradients of the parameter of the local model;

transmitting, by the local device, the compressed gradient information to a parameter server;

reconstructing, by a parameter server, gradients of the parameters of the local model based on the compressed gradient information received from the local device; and updating, by the parameter server, parameters of a global model based on the reconstructed gradients of the parameters of the local model, wherein the generating comprises:

performing a block sparsification by transforming a high-dimensional local source vector which forms the gradients of the parameters of the local model, into a plurality of low-dimensional S-sparse sub-vectors; and performing a digital encoding of transforming the plurality of low-dimensional S-sparse sub-vectors into a digital bit sequence form, and wherein the performing the digital encoding comprises:

transforming the plurality of low-dimensional S-sparse sub-vectors into a plurality of S-dimensional linear transformed vectors; and performing a scalar quantization of transforming each element of the plurality of S-dimensional linear transformed vectors into a digital form.

2. The method of claim 1, wherein the performing the block sparsification comprises:

dividing the high-dimensional local source vector into L sub-vectors; and generating the low-dimensional S-sparse sub-vectors by selecting S largest elements from among the L sub-vectors and removing residual elements.

3. The method of claim 2, wherein the generating the low-dimensional S-sparse sub-vectors is performed in parallel for the L sub-vectors.

4. The method of claim 2, wherein the generating the low-dimensional S-sparse sub-vectors is performed based on an optimal sparsity level S associated with a quantization level Q that maximizes an optimization objective function in which local vector reconstruction performance is taken into consideration.

5. The method of claim 1, wherein the performing the block sparsification comprises:

reconstructing compressed gradient information digitally encoded through the digital encoding step;

storing the residual elements excluding the reconstructed gradient information from the high dimensional local source vectors; and adding the stored residual elements to a high-dimensional source gradient vector of a next order.

6. The method of claim 1, wherein the transforming the plurality of low-dimensional S-sparse sub-vectors into the plurality of S-dimensional linear transformed vectors further comprises:

generating S-dimensional vectors by selecting non-zero elements from each of the plurality of low-dimensional S-sparce sub-vectors;

calculating experiential mean value and variance value of the S-dimensional vectors;

transforming the S-dimensional vectors into normalized vectors using the experiential mean value and variance value; and transforming the normalized vectors into linear transformed vectors using S-dimensional orthogonal matrix or equivalent matrix thereof.

7. The method of claim 6, wherein the S-dimensional orthogonal matrix is Hadamard matrix or random Gaussian matrix.

8. The method of claim 1, wherein the scalar quantization is performed based on a quantization level Q that maximizes an optimization objective function in which source vector reconstruction performance is taken into consideration.

9. The method of claim 8, wherein the quantization level Q is determined based on allowed communication overhead.

10. The method of claim 1, wherein the digital encoding further comprises performing a position encoding of representing positions, at which S non-zero values are present within the plurality of low-dimensional S-sparse sub-vectors, by a digital bit sequence.

11. The method of claim 1, wherein the reconstructing comprises acquiring an estimated value of a normalized vector from a quantized value vector using minimized mean square error estimation scheme.

12. The method of claim 11, wherein the reconstructing further comprises performing an inverse normalization on the estimated value of the normalized vector using experiential mean value and variance value obtained during a normalization procedure.

13. A method for learning of distributed artificial intelligence by a parameter server and local devices, the method comprising:

generating, by the parameter server, compressed global model parameter information by compressing parameters of a global model;

transmitting, by the parameter server, the compressed global model parameter information to the local devices;

reconstructing, by each of the local devices, the parameters of the global model based on the compressed global model parameter information received from the parameter server; and storing, by each of the local devices, the reconstructed parameters of the global model as a local model, wherein the generating comprises:

performing a block sparsification by transforming a high-dimensional global source vector, which forms the gradients of the parameters of the global model, into a plurality of low-dimensional S-sparse sub-vectors; and performing a digital encoding of transforming the plurality of low-dimensional S-sparse sub-vectors into a digital bit sequence form, and wherein the performing the digital encoding comprises:

transforming the plurality of low-dimensional S-sparse sub-vectors into a plurality of S-dimensional linear transformed vectors; and performing a scalar quantization of transforming each element of the plurality of S-dimensional linear transformed vectors into a digital form.

14. An apparatus for learning of distributed artificial intelligence, the apparatus comprising:

memory configured to store one or more instructions; and a processor configured to execute the one or more instructions;

wherein, by executing the one or more instructions, the processor is further configured to:

update parameters of a local model by training the local model based on a local dataset;

generate compressed gradient information by compressing gradients of the parameters of the local model; and control a local device to transmit the compressed gradient information to a parameter server; and receive parameters of a global model from the parameter server, wherein the processor, for the generating the compressed gradient information, is further configured to:

transform a high-dimensional local source vector which forms the gradients of the parameters of the local model, into a plurality of low-dimensional S-sparse sub-vectors through a block sparsification process; and transform the plurality of low-dimensional S-sparse sub-vectors into a digital bit sequence form through a digital encoding process, by:

transforming the plurality of low-dimensional S-sparse sub-vectors into a plurality of S-dimensional linear transformed vectors; and performing a scalar quantization of transforming each element of the plurality of S-dimensional linear transformed vectors into a digital form.

15. The apparatus of claim 14, wherein the parameters of the global model received from the parameter server is compressed information of the parameters of the global model.

16. The apparatus of claim 14, wherein the processor is further configured to:

update the parameters of the local model based on the parameters of the global model; and update the parameters of the local model again by training the local model based on a new local dataset.

\* \* \* \* \*